United States Patent [19]

Thomas

[11] 4,060,423

[45] Nov. 29, 1977

[54] HIGH-TEMPERATURE GLASS COMPOSITION

[75] Inventor: George L. Thomas, Bay Village, Ohio

[73] Assignee: General Electric Company, Schenectady, N.Y.

[21] Appl. No.: 708,949

[22] Filed: July 27, 1976

[51] Int. Cl.$^2$ ............................. C03C 3/04; C03C 3/10
[52] U.S. Cl. ...................................................... 106/52
[58] Field of Search ............................................ 106/52

[56] References Cited

U.S. PATENT DOCUMENTS

| | | | |
|---|---|---|---|
| 2,961,328 | 11/1960 | Babcock et al. | 106/52 |
| 3,489,627 | 1/1970 | Botden | 106/52 |
| 3,496,401 | 2/1970 | Dumbaugh | 106/52 |
| 3,942,992 | 3/1976 | Flannery | 106/52 |
| 3,978,362 | 8/1976 | Dumbaugh et al. | 106/52 |

*Primary Examiner*—Winston A. Douglas
*Assistant Examiner*—Mark Bell

*Attorney, Agent, or Firm*—John F. McDevitt; Lawrence R. Kempton; Frank L. Neuhauser

[57] ABSTRACT

Aluminosilicate glasses containing BaO and CaO are provided having combined high softening points along with exceptionally low liquidus temperatures. These glasses are within the following compositional limits in percent by weight:

| Oxides | Percentage Range |
|---|---|
| $SiO_2$ | 55–68 |
| $Al_2O_3$ | 15–18 |
| CaO | 7–13 |
| BaO | 6–16 | except for incidental impurities, residual fluxes and refining agents. The weight ratio of $Al_2O_3$ to combined weight ratio of CaO and BaO in the present glass composition is maintained in the range 0.6:1 to 1:1. Such glasses provide an improved hermetic seal for high temperature lamp envelopes.

4 Claims, 1 Drawing Figure

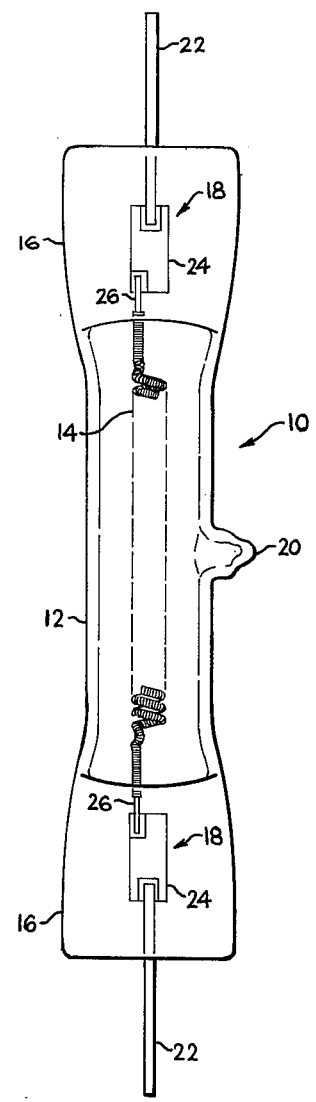

HIGH-TEMPERATURE GLASS COMPOSITION

BACKGROUND OF THE INVENTION

This invention relates to high temperature aluminosilicate glasses containing CaO and BaO in the proper proportions so that the glass reliably provides a hermetic seal to molybdenum metals in critical applications such as commonly employed for incandescent lamps being operated at elevated temperatures of 500° C and higher. More particularly, certain electric lamp designs require a transparent envelope material capable of withstanding very high temperatures wherein said envelope is also sealed hermetically to electrical in-leads. Among these lamp types are regenative cycle, halogen containing lamps, and high intensity discharge lamps. Fused quartz was the original lamp envelope material used for transparent hermetically sealed envelopes in such lamps because of its high temperature capabilities along with Vycor glass, but both glasses proved expensive and difficult to work with at the extremely high working temperatures involved.

More recently, two high temperature glasses were developed in the aluminosilicate system. These glasses are used in iodine cycle incandescent lamps by reason of being alkali metal oxide free to prevent darkening of the glass by formation of alkali metal halide crystals on the interior wall of the lamp envelope during operation. Both glasses consist essentially of $SiO_2$, $Al_2O_3$, BaO, and CaO with an optional $B_2O_3$ content in small amounts along with still other metal oxides being employed to adjust the thermal coefficient of expansion for a proper match with the particular metal body in the glass-to-metal seal. One glass employs in percentages by weight 57.3 $SiO_2$, 16.2 $Al_2O_3$, 9.4 CaO, 5.6 MgO, 0.036 $K_2O$, 0.11 $Na_2O$, 4.3 $B_2O_3$, 0.2 $ZrO_2$, 0.03 $Li_2O$, 0.02 $Rb_2O$, and 6.3 BaO along with residual oxide fluxes and exhibits a linear thermal coefficient of expansion of approximately 44.3 $\times$ $10^{-7}$ cm/cm/0° C in the 0–300° C temperature range. The other glass employs in percentages by weight 65.5 $SiO_2$, 18.8 $Al_2O_3$, 7.2 CaO, 0.01 $K_2O$, 0.14 $Na_2O$, 0.09 $ZrO_2$, and 8.3 BaO and provides a 35.7 $\times$ $10^{-7}$ cm/cm/° C linear thermal expansion coefficient over the aforementioned temperature range. A principal compositional difference between said glasses is the presence of $B_2O_3$ in the higher expansion glass which undesirably lowers the softening point and strain point for glass-to-metal seal applications.

An improved aluminosilicate glass for direct hermetic sealing to molybdenum in-leads is thereby still desired with a thermal expansion in the approximate range 42–48 $\times$ $10^{-7}$ cm/cm/° C so that either flat or round leads can be used without introducing significant residual strain and with said glass seal permitting higher temperature operation as well as other advantages. In achieving this objective for molybdenum in-leads, it is generally required that very thin flat foils be used with the conventional aluminosilicate glasses, and the use of such foils has limited current carrying ability of the regenerative cycle incandescent lamps and also proved expensive in producing said lamps. It would also be desirable to have glasses with higher applicability temperatures which do not require working temperatures as high as the available aluminosilicate glasses. The strain point of the glass composition is significant for such lamp applications since the glass envelope must withstand temperatures in excess of 500° and usually in the range 500°–700° C without either distortion or failure. The glasses are generally formed into lamp envelopes from tubing at temperatures above their softening point. The liquidus temperature of the glass composition also has significance during glass manufacture and is the minimum temperature at which the glass can be formed without precipitating undesired crystals over a period of time. In considering all of the above indicated physical properties of a desirable aluminosilicate glass for this type hermetic sealing application, therefore, it becomes desirable to have as high a strain point as possible along with a liquidus temperature as low as possible.

SUMMARY OF THE INVENTION

It is an object of the present invention to provide an improved aluminosilicate seal glass which is especially useful as the envelope material in high temperature lamps. It is a further objective to provide an improved aluminosilicate glass which can be manufactured more readily and used for hermetic sealing of molybdenum in-leads that are essentially strain-free. A still further important objective is to provide a boric oxide free and lead oxide free glass for molybdenum seals which can be melted without special air cleaning devices.

Briefly stated, the present glass composition consists essentially of oxides as calculated from the starting batch materials in approximate percents by weight 55–68 $SiO_2$, 15–18 $Al_2O_3$, 6–13 CaO, and 6–16 BaO along with minor amounts of incidental impurities, residual fluxes and refining agents, wherein the weight ratio of $Al_2O_3$ to combined weight ratio of CaO and BaO is about in the range 0.6:1 to 1:1. The present glass composition is further characterized by having a liquidus temperature no greater than about 1250° C, a strain point of at least about 725° C and an average coefficient of linear thermal expansion in the 0–300° C temperature range between about 42 $\times$ $10^{-7}$ cm/cm/° C to about 48 $\times$ $10^{-7}$ cm/cm/° C. The present glass composition is also characterized as distinctive in obtaining the aforementioned physical properties by replacement of all $B_2O_3$ with properly controlled amounts of $Al_2O_3$, CaO, and BaO within the relatively narrow ratios herein specified.

BRIEF DESCRIPTION OF THE DRAWING

The accompanying drawing is a side elevation view of one type regenerative cycle incandescent lamp employing the improved glass-to-metal seals according to the present invention.

DESCRIPTION OF THE PREFERRED EMBODIMENTS

Referring to the accompanying drawing, a double-ended type lamp 10 is shown which includes a transparent envelope 12 of the present glass composition, a tungsten filament 14, pinch seal portions 16, lead-in conductors 18, and an inert gas filling (not shown). Said inert gas filling can comprise an inert gas such as argon which further includes a halogen such as iodine to produce the well-known tungsten-halogen cycle of lamp operation. The lamp gas filling is introduced through an exhaust tube (not shown) with the tipped-off residue being shown at 20. The lead-in conductors 18 each comprise an outer lead wire 22, foil element 24, and inner lead 26, which are all formed of molybdenum metal. Said lead-in conductor assembly is hermetically sealed in both ends of the lamp envelope 12 at the pinch seal portions 16.

As can be further noted from said drawing, the particular glass-to-metal seal being depicted is provided by a direct vacuum-tight seal of the glass around the individual molybdenum foil and wire elements of the lead-in conductor assembly. In forming the desired hermetic seal, it has not been necessary to specially pre-treat the metal surfaces since the molten glass composition sufficiently bonds to a relatively clean metal surface at the seal forming temperature. The pinching step employed during lamp manufacture is also sufficient to produce a relatively strain-free seal without need for annealing post treatment.

The preferred glasses listed below in Table I exhibit still further desirable characteristics for high temperature lamp fabrication and use. These glasses were found relatively free from reboiling when flame worked during tube drawing. Additionally, these glasses have a low residual water content which prevents the undesirable evolution of water during lamp operation. The general glass composition is also amendable to incorporation of ultraviolet absorbing ions so that short wave radiation can be filtered out of the light emitted by the lamp. The present glass composition invention also represents a eutectic region in the aluminosilicate system further containing CaO and BaO which provides the lowest liquidus temperatures that can be achieved for this system.

The particular glasses reported in Table I (on the following page) were melted in platinum crucibles of 150 gm. capacity at temperatures in the range 1600°–1650° C with the glass being refined at about 1550° C. Tubing was drawn from special larger melts at 1560° C. The chemical composition for said glasses along with strain point, softening point, liquidus temperature, and expansion coefficient are reported to illustrate the optimum physical characteristics which can be obtained. As is common in glass technology, the glass compositions are reported in terms of oxides as calculated from the batch starting materials.

TABLE I

|  |  | 1 | 2 | 3 | 4 | 5 | 6 |
|---|---|---|---|---|---|---|---|
| wt. % | $SiO_2$ | 63.7 | 61.4 | 61.8 | 59.4 | 62.6 | 60.1 |
|  | $Al_2O_3$ | 16.8 | 16.9 | 15.6 | 16.1 | 16.2 | 16.6 |
|  | CaO | 12.6 | 12.7 | 11.4 | 11.3 | 9.4 | 10.1 |
|  | BaO | 6.9 | 9.0 | 11.2 | 13.2 | 11.8 | 13.2 |
| Mole % | $SiO_2$ | 71.0 | 69.4 | 70.5 | 69.0 | 72.0 | 70.0 |
|  | $Al_2O_3$ | 11.0 | 11.3 | 10.5 | 11.0 | 11.0 | 11.4 |
|  | CaO | 15.0 | 15.3 | 14.0 | 14.0 | 11.7 | 12.6 |
|  | BaO | 3.0 | 4.0 | 5.0 | 6.0 | 5.3 | 6.0 |
| Expansion (0–300° C) $\times 10^{-7}/°$ C | | 43.3 | 45.6 | 45.9 | 46.5 | 43.5 | 45.4 |
| Softening Pt., ° C | | 1011 | 997 | 997 | 993 | 1028 | — |
| Strain Pt., ° C | | 772 | 745 | 743 | 747 | 757 | — |
| Liquidus temp., ° C | | 1210 | 1200 | 1185 | 1178 | 1198 | 1180 |

As can be noted from the foregoing table, the example 5 glass most closely approximates the working characteristics desired in both softening and strain point. This can be further noted from the absence of $B_2O_3$ in all above glass examples wherein it was still possible to obtain thermal expansion within the range needed for substantially strain-free seals to molybdenum. Said absence of $B_2O_3$ also did not cause melting or refining problems during glass manufacture. The further absence of PbO in the preferred glasses also helps to prevent darkening in regenerative cycle incandescent lamps of the type above identified since trace amounts greater than 100 ppm in the glass have caused darkening.

Although there may be minor differences between the glass composition as calculated in the conventional manner from the batch constituents and the actual glass composition obtained therefrom, both compositions will be essentially the same. There is only slight volatility of the batch constituents in the present glass composition during melting and which can be accompanied by pickup of other constituents at the trace level from any refractories employed to melt the glass. Consequently, the present invention contemplates a glass composition having the same compositional ranges above set forth as calculated in conventional manner from the starting batch formulations.

It will be apparent from the foregoing description that a novel aluminosilicate glass composition is provided which affords significant advantages as a general purpose sealing glass for the molybdenum in-lead elements of various high temperature operation electric lamps. It is also apparent that other glasses than above specifically disclosed are included within the specified compositional limits. For example, the optional incorporation of small amounts of ultraviolet absorbing oxide such as $CeO_2$ and $V_2O_5$ in the present glass composition provides comparable physical properties for sealing to molybdenum metals. Additionally, it is contemplated to substitute other alkaline earth oxides for BaO in the present glasses and still obtain comparable physical properties. It is intended to limit the present invention, therefore, only by the scope of the following claims.

What I claim as new and desire to secure by Letters Patent of the United States is:

1. A molybdenum seal glass composition which consists essentially of oxides in approximate percent by weight 55–68 $SiO_2$, 15–18 $Al_2O_3$, 7–13 CaO, and 6–16 BaO, along with minor amounts of incidental impurities, residual fluxes, and refining agents, wherein the weight ratio of $Al_2O_3$ to combined weight ratio of CaO and BaO is about in the range 0.6:1 to 1:1 so as to reside in the eutectic region of this aluminosilicate system, said glass composition having a liquidus temperature no greater than about 1250° C, a strain point of at least about 725° C, and an average coefficient of linear thermal expansion in the 0–300° C temperature range between about $42 \times 10^{-7}$ cm/cm/° C to about $48 \times 10^{-7}$ cm/cm/° C.

2. A glass composition as in claim 1 which is essentially alkali metal ion free and lead oxide free.

3. A glass composition as in claim 1 wherein the mole % CaO content exceeds the mole % BaO content.

4. A molybdenum seal glass composition for a regenerative cycle halogen-containing incandescent lamp which consists essentially of oxides in approximate percent by weight 63 $SiO_2$, 16 $Al_2O_3$, 9 CaO, and 12 BaO so as to reside in the eutectic region of this aluminosilicate system, along with minor amounts of incidental impurities, residual fluxes and refining agents, said glass composition having a liquidus temperature of approximately 1200° C, an average coefficient of linear thermal expansion in the 0°–300° C temperature range of about $43.5 \times 10^{-7}$ cm/cm/° C, and a strain point of at least 750° C.

* * * * *